United States Patent [19]

Murata

[11] Patent Number: 5,396,292

[45] Date of Patent: Mar. 7, 1995

[54] ENCODING APPARATUS FOR MOTION VIDEO SIGNALS

[75] Inventor: Eri Murata, Tokyo, Japan

[73] Assignee: NEC Corporation, Tokyo, Japan

[21] Appl. No.: 22,315

[22] Filed: Feb. 25, 1993

[30] Foreign Application Priority Data

Feb. 26, 1992 [JP] Japan .................. 4-039838

[51] Int. Cl.⁶ ...................... H04N 7/133; H04N 7/137
[52] U.S. Cl. ................................... 348/409; 348/412; 348/413; 348/415; 348/416; 348/403; 348/404; 348/407
[58] Field of Search ........................ 358/133, 135, 136; 348/384, 390, 394, 400, 401, 402, 403, 404, 405, 415, 416, 406, 409–413; H04N 7/133, 7/137

[56] References Cited

U.S. PATENT DOCUMENTS

| | | | |
|---|---|---|---|
| 5,025,482 | 7/1991 | Murakami et al. | 358/135 |
| 5,072,295 | 12/1991 | Murakami et al. | 358/135 |
| 5,089,888 | 2/1992 | Zdepski et al. | 358/133 |
| 5,089,889 | 2/1992 | Sugiyama | 358/135 |
| 5,121,202 | 6/1992 | Tanoi | 358/135 |
| 5,134,475 | 7/1992 | Johnston et al. | 358/136 |
| 5,144,426 | 9/1992 | Tanaka et al. | 358/133 |

OTHER PUBLICATIONS

Takishima et al., "A Study on Control Method for Low Bit Rate Video Coding," 1990 Spring National Convention Record, The Institute of Electronics, Information and Communication Engineers, No. D-311.

*Primary Examiner*—Tommy P. Chin
*Assistant Examiner*—Vu Le
*Attorney, Agent, or Firm*—Foley & Lardner

[57] ABSTRACT

A subtracter (20) supplies a prediction error signal (21), derived from a prediction signal (101) and an input motion video signal (1). A quantizer (30) quantizes the prediction error signal to generate a quantized prediction error signal (31). A reproduced prediction error signal (81) reproduced by an inverse-quantizer (80) is added to the prediction signal by an adder 90, and the sum is supplied to the predictor (100), which generates the prediction error signal. The quantized prediction error signal is converted by a variable word length coder (40) into a variable word length code sequence. A generated information quantity calculating section (50) counts the number of bits in the sequence frame by frame. A quantization characteristic determining circuit (60) supplies, on the basis of the result of counting, a controller (70) with a quantization characteristic candidate signal 61 indicating the candidate of the quantization characteristic to be used in the next frame. The controller 70 compares the coarseness of the quantization characteristic used in the preceding frame with the quantization characteristic candidate signal, determines the quantization characteristic to be used in the current frame, and supplies a quantization characteristic control signal (75) to the quantizer (30) and the inverse-quantizer (80).

10 Claims, 3 Drawing Sheets

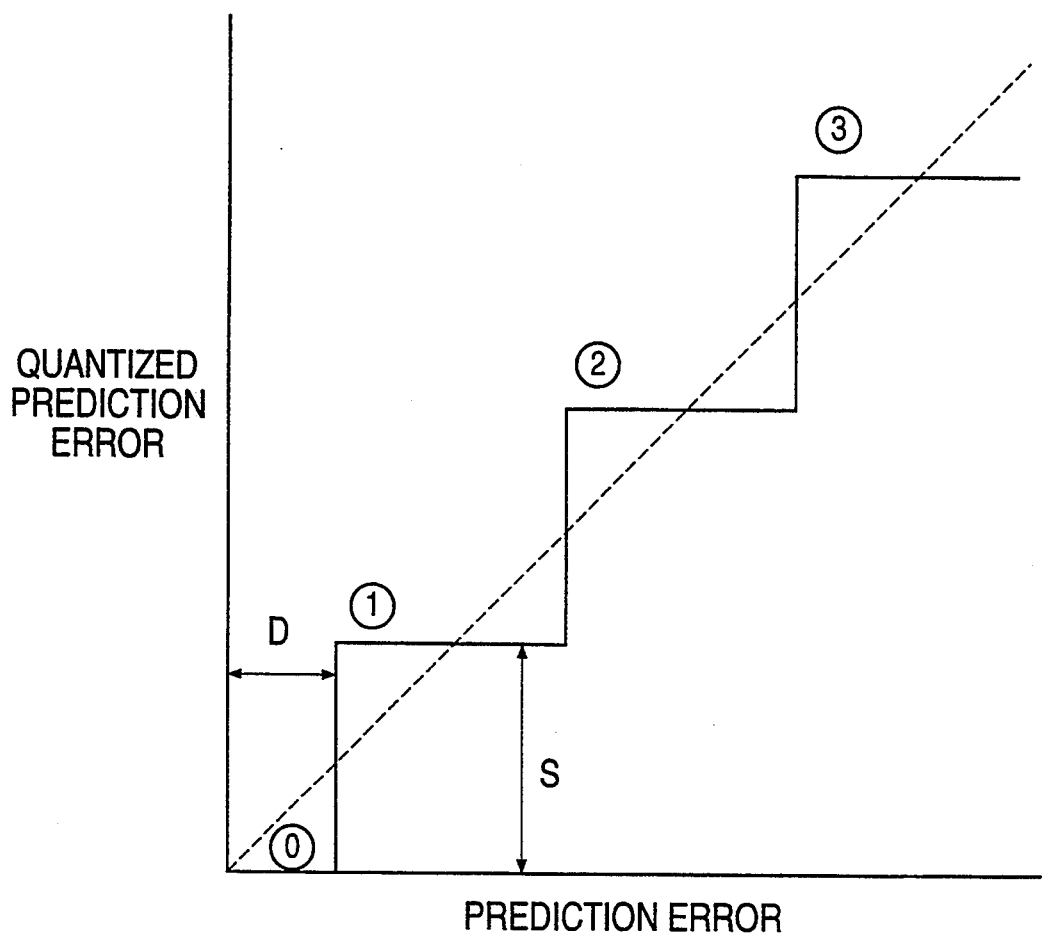

ENCODING APPARATUS FOR MOTION VIDEO SIGNALS

BACKGROUND OF THE INVENTION

The present invention relates to encoding control of a motion video signal encoding apparatus for use in television conference systems and television-utilizing education systems, and more particularly to an encoding apparatus for controlling the coarseness of a quantization characteristic to keep substantially constant the quantity of information generated after encoding.

A motion video signal encoding system, or a data compression system, using interframe coding or the like for information source coding, subjects input motion video signals to interframe prediction, and obtains prediction error signals. These prediction error signals are quantized by a quantizer into quantized prediction error signals. These quantized prediction error signals are converted by a variable word length coder into a variable word length code sequence to be written into a buffer memory. The contents of this buffer memory are read out at a constant transmission rate, and sent out to a transmission path. This buffer memory performs rate matching between the variable word length coder output, which output at random timings, with the constant transmission rate on the transmission path.

The average output code length of this variable word length coder varies dependent on the area of the moving parts contained in the motion video picture. Therefore, since the average code length of the output of the variable word length coder is extended when motion video pictures having a larger moving part area are consecutively entered, the buffer memory is exposed to the risk of overflow. In order to prevent the buffer memory from overflowing, when the area of moving parts in motion video signals grows, i.e. the average code length of the output of the variable word length coder extends, beyond a certain limit, the encoding apparatus reduces the average code length of the output of the variable word length coder by making the quantization characteristic of the quantizer coarser. The cost of this reduction in output code quantity is a deterioration in the quality of decoder pictures reproduced on the receiving side. Such control will be referred to as encoding control hereinafter in this specification.

For an example of such encoding control, reference may be made to Y. Takishima and M. Wada, "A Study on control Method for Low Bit Rate Video Coding" in the 1990 Spring National Convention Record, The Institute of Electronics, Information and Communication Engineers, lecture No. D-311.

By the encoding control technique described in this reference, the number of codes in the output of a variable word length coder is counted for every fixed period, for instance one frame period; the quantization characteristic of sufficient coarseness to reduce this count to a prescribed number of codes per-frame is estimated according to the count and to the quantization characteristic used in this frame time; and this estimated quantization characteristic is used for encoding the motion video signals of the next frame.

The encoding control method described in this reference, however, is susceptible to the following disadvantage when a moving object occupying a large area in the television frame suddenly stops. For instance, suppose that this moving object is moving until frame No. 99, and stops in frame No. 100. The quantization characteristic to be used for encoding the picture of frame No. 100, which is determined by the count obtained for the picture of frame No. 99, will be coarse. Then, because this coarse quantization characteristic is used for the encoding of the picture of frame No. 100 though the previously moving large object in it is now static, the count for the picture of frame No. 100 will become smaller. As fine quantization characteristic is to be used for the encoding of the picture of frame No. 101, the count for this picture will become greater again. As a consequence, a coarse quantization characteristic is used for the encoding of the picture of frame No. 102. Thus, according to the prior art described in this reference, if an object of a large area suddenly stops, coarse and fine quantization characteristics may be selected for alternate frames. In this case, a decoded picture for which the coarse quantization characteristic was used would involve a large encoding distortion, while one for which the fine quantization characteristic was used would be substantially free from encoding distortion, so that the observer at the receiving end would be shown decoded pictures alternately greatly distorted and hardly distorted, varying from frame to frame. This alternate presentation of greatly distorted and hardly distorted pictures would give the observer an impression of a greater deterioration in picture quality than when greatly distorted pictures alone are presented.

SUMMARY OF THE INVENTION

An object of the present invention, therefore, is to provide an encoding apparatus for motion video signals, based on an encoding control technique capable of preventing picture quality deterioration due to the alternate use of coarse and fine quantization characteristics.

According to the invention, there is provided an encoding apparatus for encoding input motion video signals by data compression comprising:

information source coding means, having a built-in quantizer whose input/output characteristics are controlled by a quantization control signal indicating the relative coarseness of the quantization characteristic, for subjecting said input motion video signals to source coding;

converting means for converting the result of information source coding by the source coding means into a variable word length code sequence;

counter means for counting the number of bits in said variable word length code sequence, resulting from conversion by the converting means, in every prescribed period;

quantization characteristic candidate determining means for supplying, on the basis of the count provided by the counter means, a first quantization characteristic candidate signal indicating the quantization characteristic candidate to be used in the next period; and control means for supplying, on the basis of the value of the quantization characteristic control signal in the period preceding the current period and the first quantization characteristic candidate signal supplied by said quantization characteristic candidate determining means, said quantizer with said quantization characteristic control signal in the current period.

BRIEF DESCRIPTION OF THE DRAWINGS

FIG. 2 illustrates an example of quantization characteristic, wherein the horizontal axis represents the prediction error signal and the vertical axis, the quantized prediction error signal;

DETAILED DESCRIPTION OF THE PREFERRED EMBODIMENTS

Figure 1:
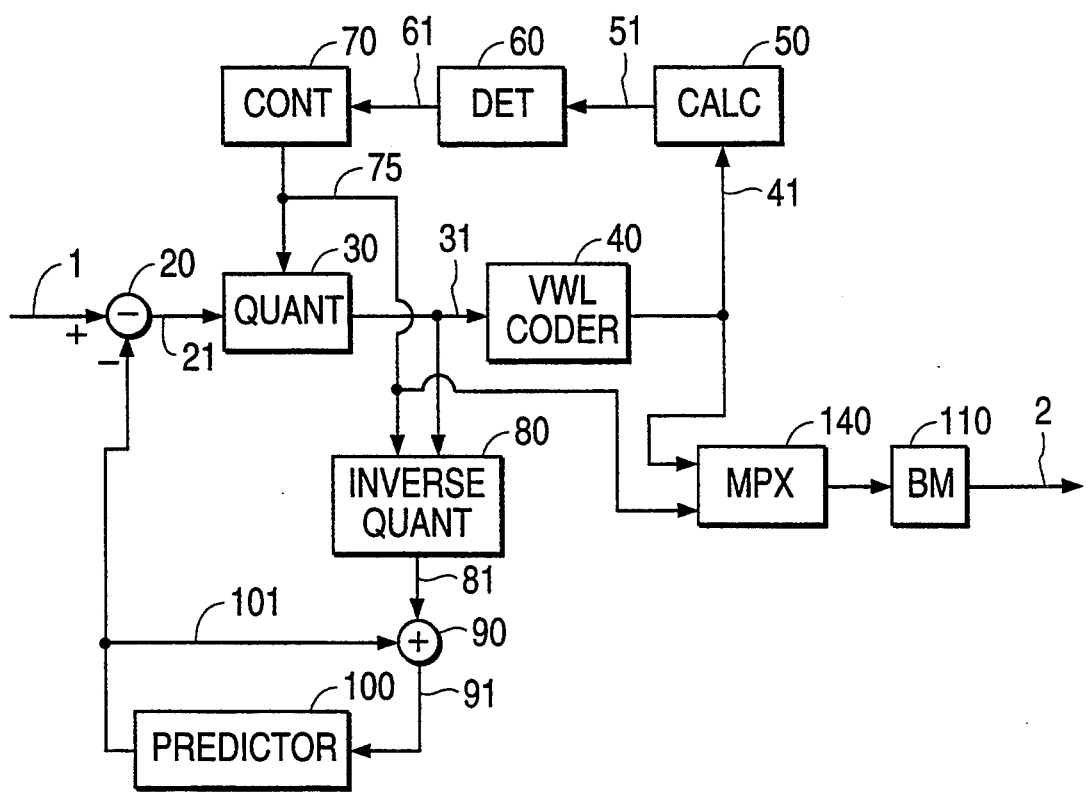
FIG. 1 is a block diagram illustrating an encoding apparatus, which is a first preferred embodiment of the present invention.

A first preferred embodiment of the present invention will be described below with reference to FIG. 1. As illustrated therein, an encoding apparatus according to the invention is provided with a subtractor 20 for supplying a prediction error signal 21 derived from an input motion video signal 1 and a prediction signal 101; a quantizer 30 for quantizing the prediction error signal 21 on the basis of a quantization characteristic control signal 75 and supplying an index sequence 31 indicating the quantized prediction error signal; an inverse-quantizer 80 for inversely quantizing the index sequence 31 on the basis of the quantization characteristic control signal 75 and supplying a reproduced prediction error signal 81; an adder 90 for supplying a local decoded signal 91 derived from the prediction signal 101 and the reproduced prediction error signal 81; and a predictor 100 for generating and supplying the prediction signal 101 on the basis of the local decoded signal 91.

The encoding apparatus is further provided with a variable word length coder 40 for subjecting the index sequence 31 to variable word length coding and supplying a variable word length code sequence 41, a buffer memory 110 for temporarily storing the variable word length code sequence 41; a generated information quantity calculation section 50 for counting the number of bits in the variable word length code sequence 41 at prescribed intervals and supplying the resultant count 51; a quantization characteristic determining circuit 60 for supplying, on the basis of the count 51, a first quantization characteristic candidate signal 61 indicating the candidate of quantization characteristic to be used in the next interval; and a controller 70 for supplying the quantizer 30 and the inverse-quantizer 80 with said quantization characteristic control signal, which is a control signal indicating the quantization characteristic on the basis of the first quantization characteristic candidate signal 61.

The subtracter 20 subtracts the prediction signal 101 from the input motion video signal 1, and supplies the prediction error signal 21. The quantizer 30 quantizes the prediction error signal 21 on the basis of the quantization characteristic control signal 75, and supplies the index 31 indicating the quantized prediction error signal. The inverse-quantizer 80 inversely quantizes the index 31 on the basis of the quantization characteristic control signal 75, and supplies the reproduced prediction error signal 81. Herein, the quantizer 30 and the inverse-quantizer 80 consist of read only memories (ROM's), and switch the quantization characteristic and the inverse-quantization characteristic, respectively, in response to the quantization characteristic control signal 75. The adder 90 adds the reproduced prediction error signal 81 and the prediction signal 101, and supplies the local decoded signal 91. The predictor 100 supplies the prediction signal 101 on the basis of the local decoded signal 91. This predictor 100 may be composed of a delay circuit for supplying the local decoded signal with a delay by one frame time if the encoding apparatus is to perform interframe prediction as information source coding. In the manner described above, the index indicating the quantized prediction signal is generated from the input motion video signal 1, which is then subjected to information source coding.

The variable word length coder 40 subjects to variable word length coding the index sequence 31 obtained by said information source coding, and supplies the variable word length code sequence 41, which is written into the buffer memory 110. The contents of the buffer memory 110 are read out at a fixed transmission rate, and sent out to a transmission path 2.

Meanwhile, the variable word length code sequence 41 is also supplied to the generated information quantity calculating section 50, which counts the number of codes in the variable word length code sequence 41 at fixed intervals, for instance in every frame period, and supplies the count 51. The quantization characteristic determining circuit 60, by the technique described in the above-cited reference by Y. Takishima et al. for example, supplies the first quantization characteristic candidate signal 61 indicating the candidate for the step width of the quantization characteristic to be used for the coding of the input motion picture in the next period, for instance the next frame. The controller 70 outputs, as will be described in further detail below, the quantization characteristic control signal 75 indicating the quantization characteristic to be used for the coding of the input motion picture in the current frame on the basis of the first quantization characteristic candidate signal 61 and the quantization characteristic used for the coding of the video signal in the preceding frame. This output is supplied to the quantizer 30 and the inverse-quantizer 80. This quantization characteristic control signal 75 is written into the buffer memory 110, after being subjected to time division multiplexing with the output of the variable word length coder 40 in multiplexer 140. This quantization characteristic control signal is subsequently sent out to the transmission path 2.

Next will be described the controller 70 which characterizes the present invention. Whereas the configuration of the controller 70 will be described later with reference to FIG. 3, the principle of the invention will be explained first. In this preferred embodiment, incidentally, the quantization step width is used as the measure of the relative coarseness of the quantization characteristic. FIG. 2 illustrates an example of quantization characteristic, which is the input/output characteristic of the quantizer 30. In FIG. 2, the horizontal axis represents the prediction error signal and the vertical axis, the quantized prediction error signal. The encircled numeral assigned to the value of each quantized prediction error signal denotes the index which is the output of the quantizer 20. Although FIG. 2 shows only the quantization characteristic values when the prediction error signal is positive, actual such values are symmetrical with respect to the origin. Further in FIG. 2, S denotes the quantization step width and D, the magnitude of the dead zone. Whereas the quantization step width is usually nonuniform unlike the characteristic illustrated in FIG. 2, "the quantization step width" in the following description may be read "the maximum quantization step width" or "the minimum quantization step width".

The controller 70 in this embodiment corrects the first quantization characteristic candidate signal 61 as will be described below, and supplies the quantization characteristic control signal 75. The quantization step width used for the coding of the video signal in the preceding frame being represented by S(i−1), that to be used for the coding of the video signal in the current frame, by S(i), and that indicated by the first quantization characteristic candidate signal 61, by S(i), the controller 70 first compares k·S (i−1), the product of the multiplication of S(i−1) by k (0<k<1), with S(i). Then it determines the quantization step width S(i) to be used for the coding of the video signal in the current frame in accordance with the standard indicated by equations (1) below.

$$S(i) = k \cdot S(i-1) \quad \text{(when } \widetilde{S(i)} --k \cdot S(i-1)\text{)}$$
$$S(i) = \widetilde{S(i)} \quad \text{(when } \widetilde{S(i)} --k \cdot S(i-1)\text{)} \quad (1)$$

Thus the controller 70 supplies the quantizer 30 and the inverse-quantizer 80, when the quantization step width $\widetilde{S(i)}$ indicated by the first quantization characteristic candidate signal 61 is significantly smaller than the quantization step width S(i−1) used for the coding of the video signal in the preceding frame, with a second quantization characteristic candidate signal indicating the quantization step width k S(i−1) as the quantization characteristic control signal 75. Otherwise, the controller 70 supplies the quantization characteristic control signal indicating the quantization step width $\widetilde{S(i)}$ to the quantizer 30 and the inverse-quantizer 80. As a result of these operations by the controller 70, if a moving object occupying a large area in a television frame suddenly stops, the quantization characteristic which has been coarse will not become suddenly fine, i.e. there will be no abrupt change in quantization step width from large to small. Therefore, the present invention can prevent the aforementioned picture quality deterioration attributable to the alternate use of coarse and fine quantization characteristics.

Figure 3:
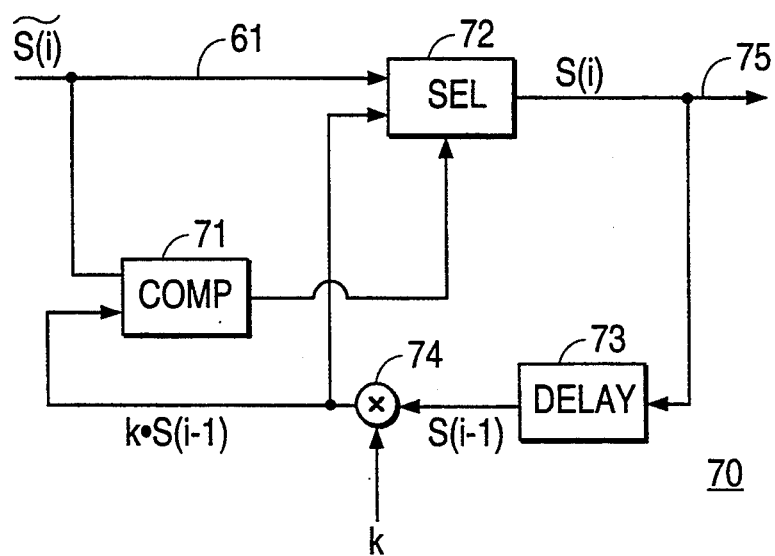
FIG. 3 is a block diagram illustrating the internal configuration of the controller in FIG. 1.

Next, with reference to FIG. 3, will be described a typical configuration of the controller 70 and its operations. As illustrated in FIG. 3, the controller 70 is provided with a comparator 71 for comparing the first quantization characteristic candidate signal 61 with a second characteristic candidate signal, or the output of a multiplier 74; a selector 72 for supplying, according to the output of the comparator 71, either the first quantization characteristic candidate signal 61 or the second quantization characteristic candidate signal, which is the output of the multiplier 74, as the quantization characteristic control signal 75; a delay circuit 73 for outputting the quantization characteristic control signal 75 with a delay by a fixed length of time; and the multiplier 74 for multiplying the output of the delay circuit 73 by k and supplying the product as the second quantization characteristic candidate signal. The value of this k, which may be a positive number between 0 and 1.0, desirably should be about 0.5.

The quantization characteristic candidate signal ($\widetilde{S(i)}$) 61 is supplied to the comparator 71 and the selector 72, which are also supplied by the multiplier 74 with the product k·S(i−1) of the multiplication of the quantization step width S(i−1), used for the coding of the video signal in the preceding frame, by k, i.e. the second quantization characteristic candidate signal. The comparator 71 compares $\widetilde{S(i)}$ with k·S(i−1) and, when $\widetilde{S(i)}$ is smaller than k·S(i−1), causes the selector 72 to supply the output k·S(i−1) of the multiplier 74 as the quantization control signal (S(i)) 75. Or when $\widetilde{S(i)}$ is not smaller than k·S(i−1), the comparator 71 causes the selector 72 to supply the second quantization characteristic candidate signal ($\widetilde{S(i)}$) 61 as the quantization control signal (S(i)) 75. This quantization characteristic control signal 75, besides being supplied to the quantizer 30 and the inverse-quantizer 80 in FIG. 1, is provided to the delay circuit 73, too. The delay circuit 73 delays the quantization characteristic control signal 75 by one frame time. As a result, the delay circuit 73 outputs the quantization step width S(i−1) used for the coding of the video signal in the preceding frame. The multiplier 74 supplies the quantization characteristic candidate signal k·S(i−1).

Whereas the present invention has been described so far with reference to a preferred embodiment thereof, the invention permits modifications such as those described below.

First, while the above-described embodiment uses interframe coding for predictive coding, other methods of predictive coding such as differential pulse code modulation (DPCM) and motion-compensated interframe coding can as well be used. The invention can also be readily applied to an encoding apparatus whose source coding method uses orthogonal transformation instead of predictive coding.

Figure 4:
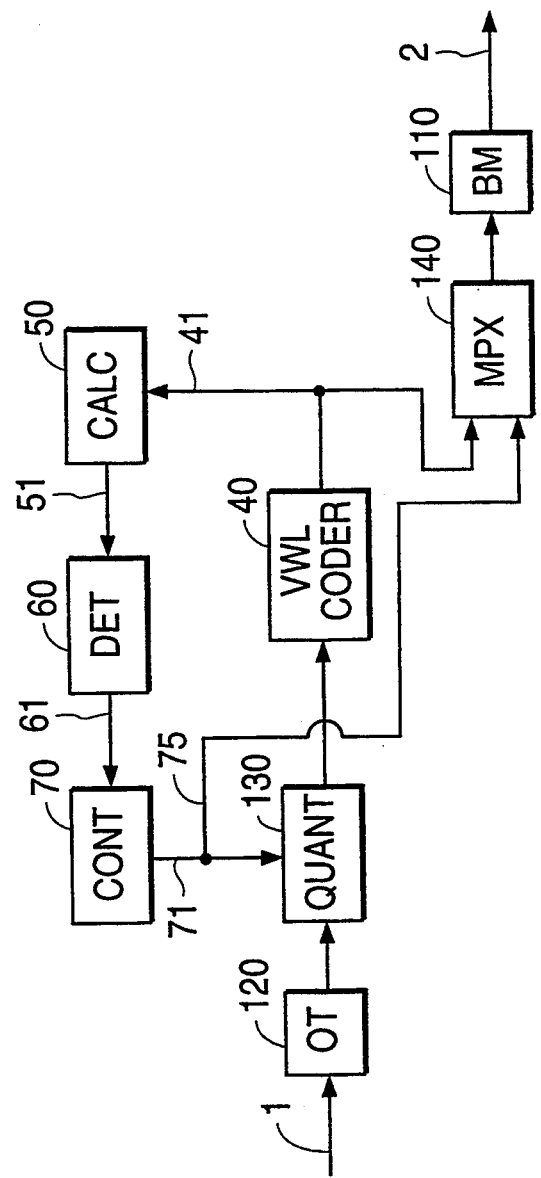
FIG. 4 is a block diagram illustrating an encoding apparatus, which is a second preferred embodiment of the invention.

FIG. 4 shows a configuration in which orthogonal transformation is used as the source coding method. In FIG. 4, input motion video signals are converted block by block, each block consisting of 8 scanning lines by 8 pixels, into 64 orthogonal transformation coefficients by an orthogonal transformer (OT) 120. A quantizer 130 quantizes the coefficients in accordance with a quantization control signal 71, and supplies the quantized coefficients. In the figure, the orthogonal transformer 120 and the quantizer 130 constitute the section which executes the information source coding. In the configuration of FIG. 4, the circuits 50, 60 and 70 operate in the same manners as their respective counterparts in the first preferred embodiment, and accordingly more detailed description of these constituent elements is dispensed with.

Although the quantization characteristic is controlled frame by frame in the preferred embodiments so far described, it may as well be controlled in block units, each television frame being divided into a plurality of blocks, or in scanning line units. In these cases, the quantity of delay by the delay circuit 73 would be altered.

Furthermore, although the quantization step width S is used in the embodiment illustrated in FIG. 1 as the measure of the relative coarseness of the quantization characteristic, the dead zone (D) shown in FIG. 2 may also be used for that purpose. It is also conceivable to make available in advance a plurality of quantization characteristics differing from one another in coarseness, assign reference numbers to these characteristics in the order of the relative fineness of the characteristic, and use these numbers as the measure of the relative coarseness of the quantization characteristic. In these modifications, the configuration of the controller 70 may be basically the same as what is illustrated in FIG. 3.

As hitherto described in detail, the present invention makes it possible to reduce the qualitative deterioration of decoded video pictures due to a sudden change in the relative coarseness of the quantization characteristic.

What is claimed is:

1. An encoding apparatus for encoding input motion video signals by data compression comprising:

information source coding means, having a built-in quantizer whose input/output characteristics are controlled by a quantization characteristic control signal indicating the relative coarseness of the quantization characteristic in every prescribed period, for subjecting said input motion video signals to source coding;

converting means for converting the result of information coding by the information source coding means into a variable word length code sequence;

counter means for counting the number of bits in said variable word length code sequence, resulting from conversion by the converting means, in every said prescribed period;

quantization characteristic candidate determining means for supplying, on the basis of the count provided by the counter means, a first quantization characteristic candidate signal indicating a quantization characteristic candidate to be used in a next period; and control means for supplying, on the basis of a value of a preceding quantization characteristic control signal in the period preceding the current period and said first quantization characteristic candidate signal, said quantizer with said quantization characteristic control signal in the current period, and wherein said control means includes, a comparator for comparing said first quantization characteristic candidate signal and a second quantization characteristic candidate signal;

a selector for supplying, in accordance with the result of comparison by said comparator, either said first quantization characteristic candidate signal or said second quantization characteristic candidate signal as said quantization characteristic control signal;

a delay circuit for delaying said quantization characteristic control signal by a length of time corresponding to one of said every prescribed periods, and supplying the delayed signal as the preceding quantization characteristic control signal of the period preceding said current period; and a multiplier for multiplying the output of said delay circuit by k ($0 < k < 1$) and supplying said second quantization characteristic candidate signal and wherein said selector supplies said first quantization characteristic candidate signal as said quantization characteristic control signal when said first quantization characteristic candidate signal is less than said second quantization characteristic candidate signal, and supplies said second quantization characteristic candidate signal as said quantization characteristic control signal when said first quantization characteristic candidate signal is greater than said second quantization characteristic candidate signal.

2. An encoding apparatus, as claimed in claim 1, wherein said information source coding means comprises:

prediction error signal generating means for supplying a prediction error signal derived from said input motion video signal and a prediction signal;

said quantizer for quantizing said prediction error signal from said prediction error signal generating means on the basis of said quantization characteristic control signal, and supplying the quantized prediction error signal as the result of said information source coding;

local decoded signal generating means for generating a local decoded signal from said quantized prediction error signal and said prediction signal; and prediction signal generating means for generating said prediction signal on the basis of the local decoded signal from the local decoded signal generating means.

3. An encoding apparatus, as claimed in claim 1, further including:

multiplexing means for multiplexing said variable word length code sequence and said quantization characteristic control signal, and supplying the resultant multiplexed signal; and buffer means for temporarily storing the multiplexed signal from the multiplexing means, and supplying the multiplexed signal at a prescribed transmission rate to a transmission path.

4. An encoding apparatus, as claimed in claim 2, wherein said prediction signal generating means is an interframe predictor.

5. An encoding apparatus, as claimed in claim 1, wherein the quantity of delay by said delay circuit is a length of time corresponding to one frame of said input motion video signal.

6. An encoding apparatus, as claimed in claim 1, wherein said first quantization characteristic candidate signal and said second quantization characteristic candidate signal represent the minimum quantization step widths of the respectively corresponding quantization characteristics.

7. An encoding apparatus, as claimed in claim 1, wherein said first quantization characteristic candidate signal and said second quantization characteristic candidate signal represent the maximum quantization step widths of the respectively corresponding quantization characteristics.

8. An encoding apparatus, as claimed in claim 1, wherein said first quantization characteristic candidate signal and said second quantization characteristic candidate signal represent the dead zone values of the respectively corresponding quantization characteristics.

9. An encoding apparatus, as claimed in claim 1, wherein said source coding means comprises:

orthogonal transformation means for orthogonally transforming said input motion video signal into orthogonal transformation coefficients; and quantizer means for quantizing said orthogonal transformation coefficients supplied from said orthogonal transformation means and supplying the quantized orthogonal transformation coefficients as the results of said information source coding.

10. A method of encoding input motion video signals by data compression comprising:

subjecting said input motion video signals to source coding in a source coder having a built-in quantizer and outputting information source coding results;

controlling input/output characteristics of said quantizer using a quantization control signal indicating a relative coarseness of a quantization characteristic in every prescribed period;

converting said information source coding results into a variable word length code sequence;

counting a number of bits in said variable word length code sequence in every said prescribed period and providing a count value;

supplying, on the basis of said count value, a first quantization characteristic candidate signal indicating a quantization characteristic candidate to be used in a next period;

delaying said quantization characteristic control signal by a length of time corresponding to one of said every prescribed periods, and supplying the delayed signal as a quantization characteristic control signal of a period preceding a current period; and multiplying the output of said delay circuit by k ($0<k<1$) to provide a second quantization characteristic candidate signal;

comparing said first quantization characteristic candidate signal and said second quantization characteristic candidate signal and outputting a comparison result;

selecting, in accordance with said comparison result, said first quantization characteristic candidate signal or said second quantization characteristic candidate signal as a selected quantization characteristic control signal and wherein said first quantization characteristic candidate signal is selected as said selected quantization characteristic control signal when said first quantization characteristic candidate signal is less than said second quantization characteristic candidate signal, and wherein said second quantization characteristic candidate signal is selected as said selected quantization characteristic control signal when said first quantization characteristic candidate signal is greater than said second quantization characteristic candidate signal; and supplying the quantizer, with said selected quantization characteristic control signal.

* * * * *